Dec. 12, 1967    R. J. KOUTNIK    3,357,454
BALANCED MULTI-WAY VALVE
Filed Jan. 20, 1964
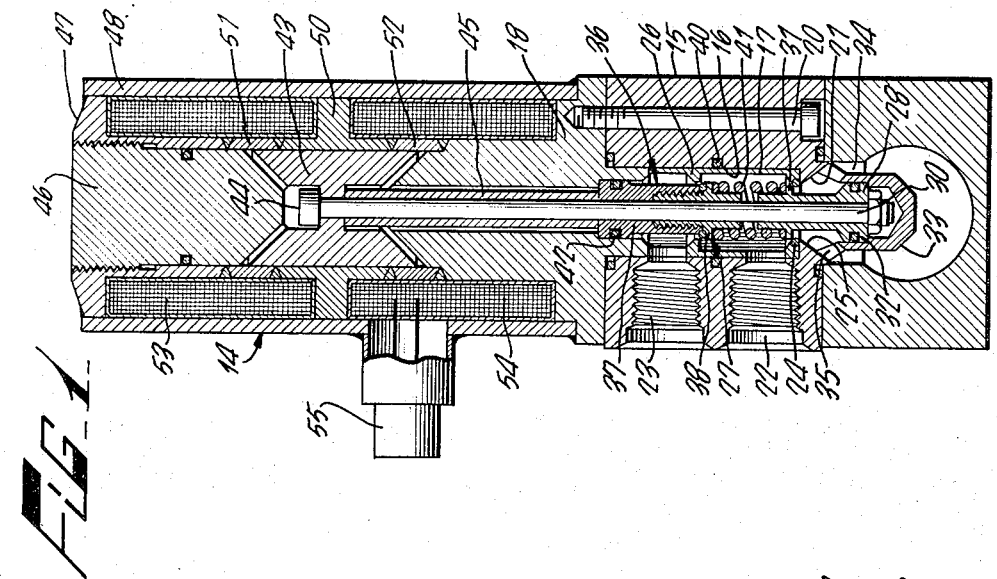
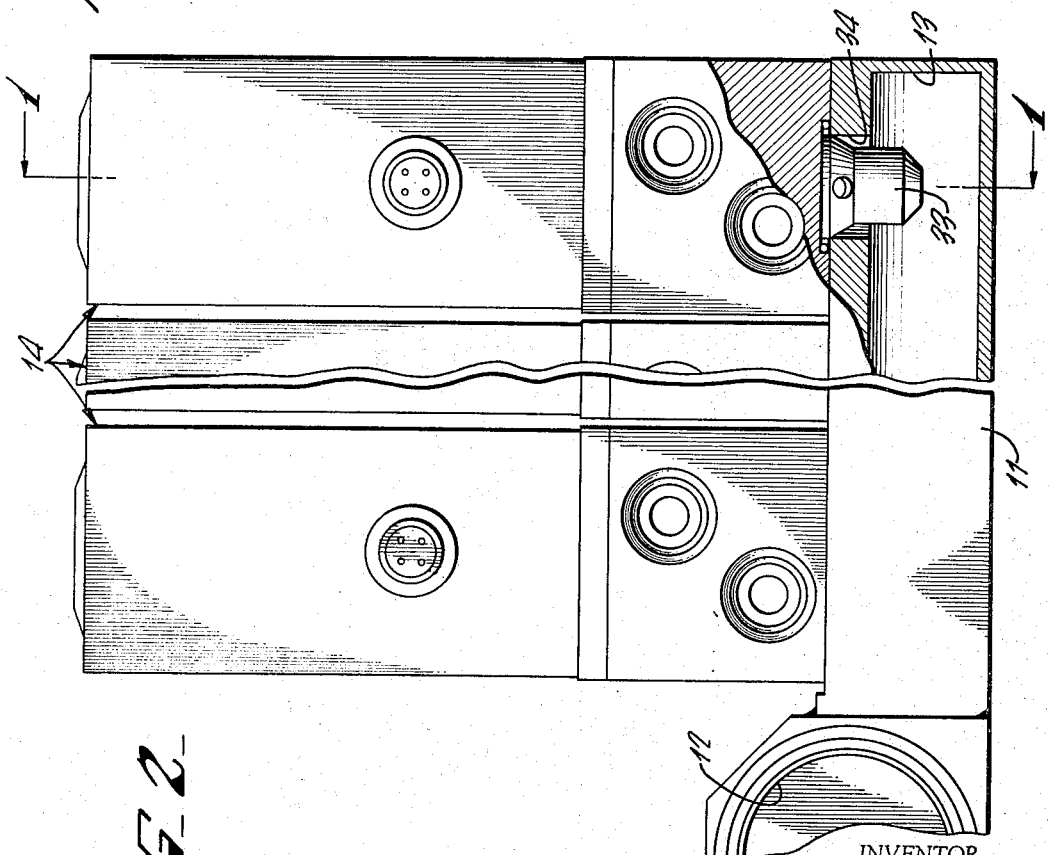
INVENTOR.
RODRICK J. KOUTNIK
BY
ATTORNEY.

United States Patent Office 3,357,454
Patented Dec. 12, 1967

3,357,454
BALANCED MULTI-WAY VALVE
Rodrick J. Koutnik, Vista, Calif., assignor, by mesne assignments, to Snap-Tite, Inc., Union City, Pa., a corporation of Pennsylvania
Filed Jan. 20, 1964, Ser. No. 338,813
3 Claims. (Cl. 137—627.5)

This invention relates to valves and has particular reference to multi-way valves.

In aircraft, rocket and missile applications, designers are constantly striving to reduce the weight and size of electromagnetically controlled valves used to handle fluids under high pressures.

A principal object of the present invention is to provide a multi-way, three-position valve of minimum weight and size capable of handling fluids under relatively high pressures.

Another object is to provide a valve of the above type having a minimum number of parts.

Another object is to provide a valve of the above type effective to normally close off all passages.

A still further obect is to provide an electrically operated valve of the above type effective to close all passages in the event of power failure.

The manner in which the above and other obects of the invention are accomplished will be readily understood on reference to the following specification when read in conjunction with the accompanying drawings, wherein:

FIG. 1 is a sectional view through a three-way, three-position valve embodying a preferred form of the present invention and is taken along the line 1—1 of FIG. 2.

FIG. 2 is a side view, partly in section, of a manifold assembly including a plurality of valves of the type shown in FIG. 1 mounted thereon.

Referring to the drawings, a manifold 11 is provided having an inlet 12 arranged to be connected to a suitable source of fluid under high pressure. The manifold has a passage 13 formed therealong and communicating with the inlet 12.

A plurality of similar valves generally indicated at 14 are spaced along the manifold and suitably attached thereto. Each valve comprises a valve body 15 having an axial opening 16 therein. An open ended sleeve 17 is fitted in the opening and held in place by a solenoid pole piece 18 of magnetic material, such as soft iron. The pole piece is secured to the body 15 by bolts, one of which is shown at 20.

An inlet passage 21 is formed in the valve body and opens into the lower end of the sleeve 17. Service and exhaust openings 22 and 23, respectively, are also formed in the body and communicate with the interior of the sleeve 17 through aligned openings in the latter.

Port forming means comprising an O-ring 24 of elastomeric or similar material is provided to form an inlet-service port. The O-ring is clamped between the lower end of the sleeve 17 and an annular shoulder 25 on the valve body.

A second port forming means in the form of an annular shoulder 26 is formed in the sleeve 17 between the service and exhaust passages to form a service-exhaust port.

A valve member generally indicated at 27 is shiftable axially in the sleeve 17 and comprises a lower poppet member 28 mounted on the lower end of a poppet rod 30. The poppet member has an annular shoulder 31 engageable with the O-ring 24 to close off the inlet-service port. A portion of the poppet member 28 extends below the opening 21 and is slidably fitted within a bearing 32 having the same diameter as the outside diameter of the shoulder 31. Such bearing is formed in a guide 33 formation integral with the valve body and extending through a transverse opening 34 in the manifold. Openings 35 in the walls of the guide formation 33 communicate the manifold passage 33 with the inlet-service port.

A second poppet member 36 is slideably mounted on the rod 30 and comprises two poppet parts 37 and 38 screw-threaded together to clamp an O-ring 40 therebetween.

A compression spring 41 is compressed between the poppet members 28 and 36 and is normally effective to hold the poppet members in engagement with their respective port forming means to close off both the inlet-service port and the service-exhaust port.

The upper poppet part 37 has a portion extending above the exhaust passage 23 and is slideably mounted in a bearing opening 42 formed in the pole piece 18. The latter opening is of the same diameter as the inside diameter of the shoulder 26, the outside diameter of shoulder 31 and the inside diameter of the bearing opening 32 so that the valve member 36 will be in balanced equilibrium at all times.

The upper end of the rod 30 is slideable in an armature 43 of magnetic material and terminates in an enlarged head 44 normally engaging an upper portion of the armature. A tube 45 is slidably mounted on the rod 30 and extends between the armature and the upper poppet member 37.

The armature 43 cooperates with the pole piece 18 and with a second pole piece 46 which is supported in place by a ring 47 of magnetic material and a cylindrical shell 48, also of magnetic material, which shell is secured at its lower end to the pole piece 18.

A ring member 50 of magnetic material surrounds the armature 43 and is suitably attached to the shell 48. Rings 51 and 52 of non-magnetic material are attached, as by welding, to the opposite ends of the ring member 50 and also to respective pole pieces 46 and 18 to hermetically seal the space within which the armature is movable.

Electromagnetic coils 53 and 54 are enclosed within the shell 48 on opposite sides of the ring member 50 and their ends are connected to terminals forming part of an electrical connector 55.

Energization of the coil 53 is effective to raise the armature 43 to thereby draw the rod 30 upwardly so as to raise the poppet member 28 to open the inlet-service port. During this operation, the spring 41 will maintain the upper poppet 36 in position to close the service-exhaust port.

Energization of the coil 54 will lower the armature 43 and thus press downwardly on the tube 45 and upper poppet member 36 to open the service-exhaust port. At this time, the spring 41 will be effective to maintain the lower poppet member 28 in port closing condition.

Upon de-energization of both coils 53 and 54, either advertently or because of power failure, the spring 41 will immediately become effective to cause both poppet members 28 and 36 to move to port closing positions.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In a three-way valve,
   a body having an axial opening and inlet, service and exhaust passages spaced along said axial opening and communicating with said opening,
   said service passage being intermediate said inlet and exhaust passages, a first port means in said opening forming a first port between said inlet and service passages, a second port means in said opening forming a second port between said service and exhaust passages, said second port being of at least substantially the same diameter as the diameter of said first port, a first valve member in said opening on one side of said inlet passage and engageable with said first port means to close said first port, a sliding seal on said first member slideable in said opening on the opposite side of said inlet passage, said sliding seal being of at least substantially the same diameter as the diameter of said first port, a second valve member in said opening on one side of said exhaust passage and slideably connected to said first valve member and engageable with said second port means to close said second port, a second sliding seal on said second member slideable in said opening on the opposite side of said exhaust passage, said second sliding seal being of at least substantially the same diameter as the diameter of said first port, spring means extending between said valve members whereby to normally maintain said valve members in engagement with said respective port means, and means for selectively moving said first valve member in one direction to open said first port and for moving said second valve member in an opposite direction to open said second port.

2. In a three-way valve, a body having an axial opening and inlet, service and exhaust passages spaced along said axial opening and communicating with said opening, said service passage being intermediate said inlet and exhaust passages, a first port means in said opening forming a first port between said inlet and service passages, a second port means in said opening forming a second port intermediate said service and exhaust passages, said second port being of at least substantially the same diameter as the diameter of said first port, a first poppet member in said opening on one side of said inlet passage and engageable with said first port means to close said first port, a sliding seal on said first member slideable in said opening on the opposite side of said inlet passage, said sliding seal being of at least substantially the same diameter as the diameter of said first port, a second poppet member in said opening on one side of said exhaust passage, said second poppet member being slideable on said first poppet member and engageable with said second port means to close said second port, a second sliding seal on said second poppet member slideable in said opening on the opposite side of said exhaust passage, said second sliding seal being of at least substantially the same diameter as the diameter of said first port, a compression spring extending between said poppet members to normally maintain said poppet members in engagement with said respective port means, means for moving said first poppet member against the action of said compression spring to open said first port, and means for moving said second poppet member against the action of said spring to open said second port.

3. In a three-way valve, a body having an axial opening and inlet, service and exhaust passages spaced along said axial opening and communicating with said opening, said service passage being intermediate said inlet and exhaust passages, a first port means in said opening forming a first port between said inlet and service passages, a second port means in said opening forming a second port intermediate said service and exhaust passages, said second port being of at least substantially the same diameter as the diameter of said first port, a first poppet member in said opening on one side of said inlet passage and engageable with said first port means to close said first port, a sliding seal on said first poppet member slideable in said opening on the opposite side of said inlet passage, said sliding seal being of at least substantially the same diameter as the diameter of said first port, a second poppet member in said opening on one side of said exhaust passage, said second poppet member being slideable on said first poppet member and engageable with said second port means to close said second port, a spring extending between said poppet members to normally maintain said poppet members in engagement with said respective port means, a second sliding seal on said second poppet member slideable in said opening on the opposite side of said exhaust passage, said second sliding seal being of at least substantially the same diameter as the diameter of said first port.

an actuating member, means forming a one-way connection betwen said actuating member and said first poppet member, means forming a one-way connection between said actuating member and said second poppet member, means for moving said actuating member in one direction whereby to move said first poppet member to open said first port, and means for moving said actuating member in an opposite direction whereby to move said second poppet member to open said second port.

References Cited
UNITED STATES PATENTS

| | | | |
|---|---|---|---|
| 2,812,218 | 11/1957 | Fitch | 137—627.5 X |
| 2,969,811 | 1/1961 | Freeman I | 137—627.5 |
| 3,025,881 | 3/1962 | Freeman II | 137—627.5 |
| 3,120,103 | 2/1964 | Beard | 137—627.5 X |
| 3,168,352 | 2/1965 | Stelzer | 137—627.5 X |

WILLIAM F. O'DEA, *Primary Examiner.*

CLARENCE R. GORDON, *Examiner.*